(No Model.)
P. R. WELLS.
SPRING TOOTH FOR HARROWS.
No. 431,241. Patented July 1, 1890.
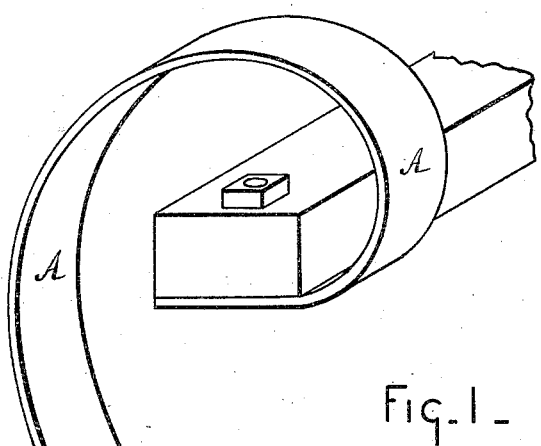
Fig. 1.
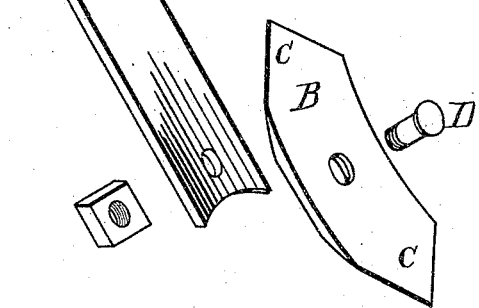
Fig. 2.
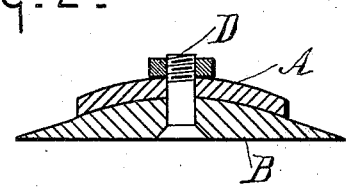
WITNESSES
F. Clough
C. J. Shipley
INVENTOR
Philip R. Wells
By Wells & Leggett & Co.
Attorneys.

UNITED STATES PATENT OFFICE.

PHILIP R. WELLS, OF DETROIT, MICHIGAN.

SPRING-TOOTH FOR HARROWS.

SPECIFICATION forming part of Letters Patent No. 431,241, dated July 1, 1890.

Application filed November 14, 1889. Serial No. 330,312. (No model.)

*To all whom it may concern:*

Be it known that I, PHILIP R. WELLS, a citizen of the United States, residing at Detroit, county of Wayne, State of Michigan, have invented certain new and useful Improvements in Spring-Teeth for Harrows; and I declare the following to be a full, clear, and exact description of the invention, such as will enable others skilled in the art to which it pertains to make and use the same, reference being had to the accompanying drawings, which form a part of this specification.

In the drawings, Figure 1 is a perspective view of a tooth embodying my invention with the parts disengaged. Fig. 2 is a part section of the same.

My invention is designed to produce a harrow-tooth in which the tooth proper and the spring-shank are so united by a single bolt that the tooth will not be displaced, and in which the front or face of the tooth is always flat.

My invention consists in a combination of devices and appliances hereinafter described and claimed.

In carrying out my invention, A represents the spring-shank, and B the tooth proper. To this tooth proper the points C are fastened, being preferably swaged or forged to the piece B.

D is the bolt, by means of which the tooth is engaged to the spring-shank.

In order to prevent any revolution of the tooth about the bolt as an axis, I form the back or rear side of the tooth convex, as shown, and then form the lower end $a$ of the spring-shank concave to fit this convex surface. By thus uniting the spring-tooth and the shank any revolution of the tooth about the bolt is prevented. It is held firmly in place, and yet in forming the tooth the front side can be left perfectly flat, as is not the case when the rear face of the tooth is made concave and the spring-shank made convex to fit it.

I have found in practice that the teeth with the convex back can be manufactured very cheaply and that this manner of uniting the tooth to the spring-shank is effective and simple.

What I claim is—

The combination, with the spring-shank having its lower front portion made concave, of the harrow-tooth having a flat front face and a convex rear face and a bolt for connecting said shank and tooth, substantially as described.

In testimony whereof I sign this specification in the presence of two witnesses.

PHILIP R. WELLS.

Witnesses:
  T. I. HOWES,
  E. A. LEWIS.